United States Patent
Faber et al.

(10) Patent No.: US 8,081,539 B2
(45) Date of Patent: Dec. 20, 2011

(54) ULTRASONIC SENSOR

(75) Inventors: Petko Faber, Renningen (DE); Christian Danz, Kleinmachnow (DE)

(73) Assignee: Robert Bosch GmbH, Stuttgart (DE)

( * ) Notice: Subject to any disclaimer, the term of this patent is extended or adjusted under 35 U.S.C. 154(b) by 506 days.

(21) Appl. No.: 12/086,410

(22) PCT Filed: Nov. 17, 2006

(86) PCT No.: PCT/EP2006/068618
§ 371 (c)(1),
(2), (4) Date: Apr. 14, 2009

(87) PCT Pub. No.: WO2007/073990
PCT Pub. Date: Jul. 5, 2007

(65) Prior Publication Data
US 2009/0249878 A1    Oct. 8, 2009

(30) Foreign Application Priority Data
Dec. 22, 2005  (DE) .......................... 10 2005 061 396

(51) Int. Cl.
*G01N 29/04*    (2006.01)
*G08G 1/14*    (2006.01)
*G01S 15/00*    (2006.01)

(52) U.S. Cl. ......................................... 367/98; 367/902
(58) Field of Classification Search .................. 367/902, 367/98
See application file for complete search history.

(56) References Cited

U.S. PATENT DOCUMENTS

| | | | |
|---|---|---|---|
| 4,581,726 A | 4/1986 | Makino et al. | |
| 4,608,674 A | 8/1986 | Guscott | |
| 5,302,956 A | 4/1994 | Asbury et al. | |
| 5,442,592 A * | 8/1995 | Toda et al. | 367/902 |
| 5,780,719 A * | 7/1998 | VanDam | 73/29.01 |
| 2009/0249878 A1 * | 10/2009 | Faber et al. | 367/93 |

FOREIGN PATENT DOCUMENTS

| | | |
|---|---|---|
| DE | 102 25 614 | 12/2003 |
| EP | 1 150 135 | 10/2001 |
| EP | 1602530 A1 * | 12/2005 |
| EP | 1 624 319 | 2/2006 |
| EP | 1643271 A1 * | 4/2006 |
| JP | 11 160191 | 6/1999 |
| JP | 11 304911 | 11/1999 |
| WO | WO 02/16958 | 2/2002 |
| WO | WO 2005/024463 | 3/2005 |
| WO | WO 2007073990 A1 * | 7/2007 |

* cited by examiner

*Primary Examiner* — Daniel Pihulic
(74) *Attorney, Agent, or Firm* — Kenyon & Kenyon LLP

(57) ABSTRACT

For an ultrasonic sensor at least one sensitivity parameter or sensitivity characteristics curve may be adjusted as a function of the air humidity and/or temperature in such a way that a predefined range or a range section may be reliably reached. Such a sensor makes it possible to reliably detect curbs, and to locate parking spaces, including curb detection under varying weather conditions.

14 Claims, 2 Drawing Sheets

ULTRASONIC SENSOR

FIELD OF THE INVENTION

The present invention relates to an ultrasonic sensor, in particular for locating parking spaces, having at least one sensitivity parameter which may be adjusted.

BACKGROUND INFORMATION

Ultrasonic sensors are used for locating parking spaces (parking space location (PSL)) to assist the driver in looking for sufficiently large parking spaces. When such a parking space is found, the semiautomatic parking assistant provides support in easily driving into the measured parking space, likewise by use of an ultrasonic sensor.

It is known from Japanese Patent No. JP 11-304911 to modify the sensitivity of an ultrasonic sensor as a function of the presence of rain, based on the switched-on state of the windshield wiper. The reception sensitivity is decreased in order to suppress interference resulting from raindrops falling on the roadway.

SUMMARY OF THE INVENTION

By using the ultrasonic sensor according to the present invention, which has at least one sensitivity parameter or sensitivity characteristics curve which may be readjusted as a function of the air humidity and/or temperature in such a way that a predefined range or a range section may be reliably reached regardless of variations in air humidity and temperature, a reliable parking space measurement may be performed even under varying weather conditions. In particular, the curb as well as the outer contours of parked vehicles may be reliably detected.

Since in Japanese Patent No. JP 11-304911 the reception sensitivity is reduced in the presence of rain, it is not possible to reliably reach a predefined range or a range section. Although nearby objects such as the corners of a vehicle could be detected without interference, the detection of more remote objects such as the curb, for example, would be significantly impaired. According to the present invention, objects within a predefined range or a range section may be reliably detected in all cases.

To allow a satisfactory trajectory plan for semiautomatic parking to be carried out, the parking space measurement system must first determine the position of the parking space boundaries with high accuracy, and then must generate information concerning the depth and shape of the parking space. The boundaries of the parking space and of the curb must be detected very reliably in order to provide information concerning the shape of the parking space.

A semiautomatic parking assistant (SPA) is effectively supported by using the measures of the present invention. After a suitable parking space has been found, the semiautomatic parking assistant computes an optimum parking trajectory as a function of the length of the parking space. By using the human-machine interface (HMI), information is transmitted to the driver concerning how to steer and actuate the gas pedal and brake in order to drive into the parking space in an optimum manner. Deviations with respect to the setpoint trajectory are compensated for by the driver himself or by automatic means. The longitudinal motion is determined by the driver. Steering may also be performed automatically, in which case the driver is responsible only for actuating the gas pedal and brake.

Since the combination of air humidity and temperature has a great influence on the range of the measurement, in particular for the function of curb recognition, in one advantageous embodiment of the present invention the switched-on state of the windshield wiper is used as an indicator, and in combination with the temperature provided by the temperature sensor the sensitivity characteristics curve of the ultrasonic sensors is adapted in such a way that good detection of the corners of the vehicle and of the curb is possible by using the ultrasonic sensor. Thus, the switched-on state of the windshield wiper is used as an indicator of very high air humidity.

In a further advantageous specific embodiment, the information, if present, concerning the prevailing air humidity of the on-board air humidity sensor may be used for modifying the sensitivity parameters of the ultrasonic sensors.

In a further specific embodiment, the information, if present, from the rain sensor may be used for modifying the sensitivity parameters of the ultrasonic sensors.

The detection field of the sensors for locating parking spaces is selected by modifying the sensitivity parameters based on the air humidity information in such a way that a high detection range is achieved; i.e., the sensitivity of the sensors is modified as a function of the air humidity. Thus, it may be ensured that a high accuracy of parking space location, including curb recognition, is achievable even under variable air humidity and temperature.

DETAILED DESCRIPTION

In the present invention, the detection field of the ultrasonic sensors used for locating a parking space is selected by modifying the sensitivity parameters or the characteristics curve(s) thereof on the basis of the temperature and/or air humidity in such a way that a predefined detection range or a range section may be reached; i.e., the sensitivity of at least one ultrasonic sensor is modified as a function of the air humidity and optionally also the temperature. Thus, a high accuracy in parking space location, including curb recognition, may be ensured even under variable air humidity and temperature. The air humidity and/or temperature is evaluated for modifying the coverage range of the ultrasonic sensor or sensors on the basis of on-board signals provided, for example, by a temperature sensor, a air humidity sensor, a rain sensor, or by a detected signal concerning the switched-on state of the windshield wiper, for modifying the sensitivity parameters of the sensors in order to increase the accuracy of the parking space location and curb detection.

It is particularly advantageous in the present invention that the accuracy of corner location and curb detection may be increased. This information is very important for the subsequent trajectory planning in order to ensure proper functioning of the SPA system.

The PSL system having optimized parking space location for semiautomatic parking is composed, for example, of a front cluster, for example six sensors, a rear cluster, for example likewise six sensors, a path signal sensor, optionally together with a steering angle sensor, and an electronic control unit. In the PSL system two sensors each are oriented at the front and/or the rear to the left and right sides in such a way that the sensors are able to perform good detection in the lateral region of the vehicle, and thus are able to measure the length and depth of a parking space when the parking space is passed. When the driver intends to park, he actuates the PSL function. The system goes into parking space location mode and indicates when a suitable parking space has been found.

Figure 1:
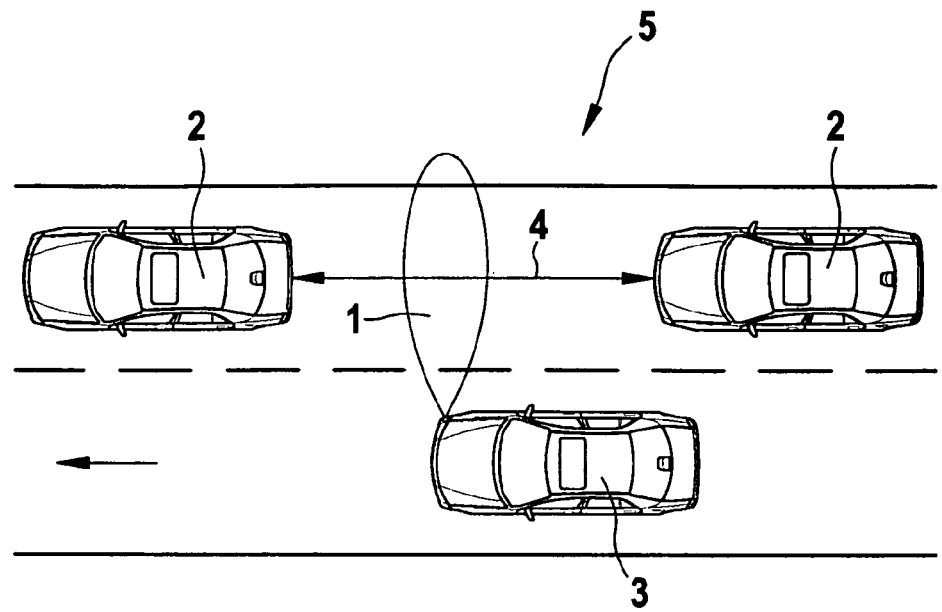
FIG. 1 shows an instance of locating a parking space, including curb detection, in the absence of rain.

FIG. 1 shows an instance of locating a parking space, including curb detection, in the absence of rain. Detection range 1 covered by the ultrasonic sensor at the right front edge of vehicle 3 seeking a parking space extends to curb 5 in the base setting of the sensitivity parameters in the absence of rain. Parked vehicles 2 determine the length of the parking space 4.

Figure 2:
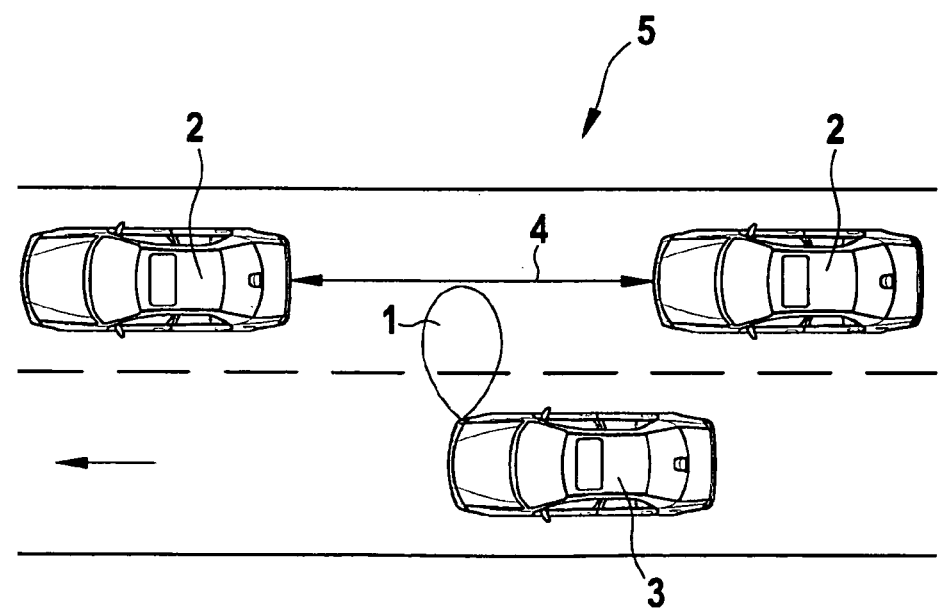
FIG. 2 shows an instance of locating a parking space, including curb detection, in the presence of rain and without adaptive modification of the sensitivity parameters according to the present invention.

FIG. 2 shows an instance of locating a parking space, including curb detection, in the presence of rain and without adaptive modification of the sensitivity parameters according to the present invention for the ultrasonic sensors. The area covered by the ultrasonic sensor with the sensitivity parameters of the ultrasonic sensor in the base setting does not reach curb 5.

Figure 3:
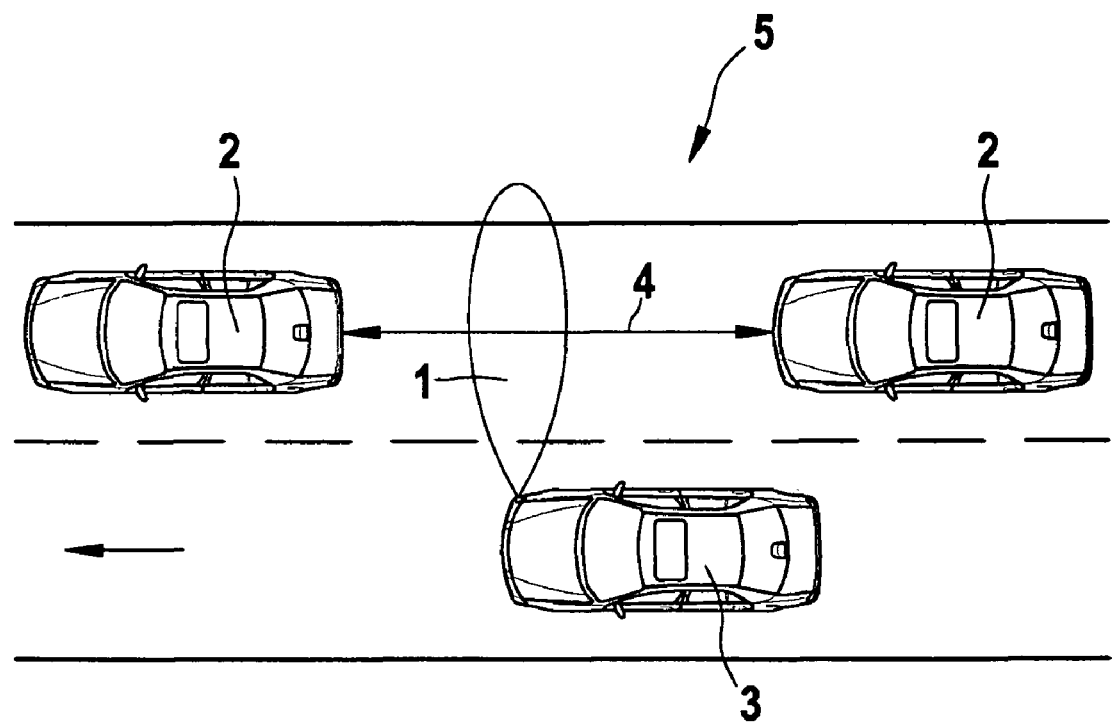
FIG. 3 shows an instance of locating a parking space, including curb detection, in the presence of rain and with adaptive modification of the sensitivity parameters according to the present invention.

FIG. 3 illustrates an instance of locating a parking space, including curb detection, in the presence of rain and with adaptive modification of the sensitivity parameters according to the present invention, so that the curb may once again be reliably detected and high accuracy of the PSL may be achieved.

The sensitivity parameters may be adjusted in various ways. When high air humidity is present the transmission power of the at least one ultrasonic sensor may be increased, or the reception sensitivity may be increased, and/or the detection threshold of the sensor may be lowered. Lowering of the detection threshold as well as increasing the reception sensitivity taken alone may result in unreliable values or invalidation of the values due to noise components. In this case it is better to also increase the transmission power. Unwanted side effects, for example reflections on undesired objects, which are higher than for desired objects generally do not occur as the result of signal damping at high air humidity. Such effects may be suppressed by selective range evaluations and by timed control of the evaluation/modification of the spatial sensitivity characteristics by superimposing the signals from multiple sensors, or by performing plausibility checks during the ultrasonic pulse measurement.

What is claimed is:

1. An ultrasonic sensor comprising:
   a sensor element having one of (a) at least one sensitivity parameter and (b) a sensitivity characteristics curve that is adjustable as a function of at least one of (c) an air humidity and (d) a temperature in such a way that a predefined range or a range section may be reached,
   wherein a switched-on state of a windshield wiper is used as an indicator for adjusting sensitivity parameters.

2. The ultrasonic sensor according to claim 1, wherein the sensor is for locating a parking space.

3. The ultrasonic sensor according to claim 1, wherein the range is specified in such a way that curb recognition is provided when passing a parking space.

4. The ultrasonic sensor according to claim 1, wherein a response of an on-board rain sensor is used as an indicator for adjusting sensitivity parameters.

5. The ultrasonic sensor according to claim 1, wherein an output signal of an on-board humidity sensor is used as an indicator for adjusting sensitivity parameters.

6. The ultrasonic sensor according to claim 1, wherein a transmission power of the ultrasonic sensor is increased when high air humidity is present.

7. The ultrasonic sensor according to claim 1, wherein at least one of (a) a reception sensitivity is increased and (b) a detection threshold is lowered when high air humidity is present.

8. A method using an ultrasonic sensor including a sensor element having one of (a) at least one sensitivity parameter and (b) a sensitivity characteristics curve that is adjustable as a function of at least one of (c) an air humidity and (d) a temperature in such a way that a predefined range or a range section may be reached, the method comprising:
   subjecting a plurality of ultrasonic pulse measurements of at least one ultrasonic sensor to a plausibility check, for recognition of at least one of (e) a curb and (f) outer contours of parked vehicles,
   wherein a switched-on state of a windshield wiper is used as an indicator for adjusting sensitivity parameters.

9. The method according to claim 8, wherein corners of the vehicles are recognized.

10. A method using an ultrasonic sensor including a sensor element having one of (a) at least one sensitivity parameter and (b) a sensitivity characteristics curve that is adjustable as a function of at least one of (c) an air humidity and (d) a temperature in such a way that a predefined range or a range section may be reached, the method comprising:
    as a function of a signal evaluation of at least one ultrasonic sensor, ascertaining a length and a depth of a parking space; and
    as a function thereof, ascertaining an optimal parking trajectory into the parking space,
    wherein a switched-on state of a windshield wiper is used as an indicator for adjusting sensitivity parameters.

11. The ultrasonic sensor according to claim 1, wherein the sensor is for locating a parking space, wherein the range is specified so that curb recognition is provided when passing a parking space, wherein an output signal of an on-board humidity sensor is used as an indicator for adjusting sensitivity parameters.

12. The ultrasonic sensor according to claim 11, wherein a transmission power of the ultrasonic sensor is increased when high air humidity is present, and wherein at least one of (a) a reception sensitivity is increased and (b) a detection threshold is lowered when high air humidity is present.

13. The ultrasonic sensor according to claim 11, wherein a response of an on-board rain sensor is used as an indicator for adjusting sensitivity parameters.

14. The ultrasonic sensor according to claim 1, wherein a transmission power of the ultrasonic sensor is increased when high air humidity is present, and wherein at least one of (a) a reception sensitivity is increased and (b) a detection threshold is lowered when high air humidity is present.

* * * * *